US012719228B2

(12) United States Patent
Luetjen et al.

(10) Patent No.: US 12,719,228 B2
(45) Date of Patent: Aug. 25, 2026

(54) SINGLE MODE BEAM

(71) Applicant: nLIGHT, INC., Camas, WA (US)

(72) Inventors: Christopher Luetjen, Camas, WA (US); Roger Farrow, Camas, WA (US)

(73) Assignee: nLIGHT, Inc., Camas, WA (US)

( * ) Notice: Subject to any disclaimer, the term of this patent is extended or adjusted under 35 U.S.C. 154(b) by 442 days.

(21) Appl. No.: 18/016,050

(22) PCT Filed: Jul. 14, 2021

(86) PCT No.: PCT/US2021/041670
§ 371 (c)(1),
(2) Date: Jan. 13, 2023

(87) PCT Pub. No.: WO2022/015876
PCT Pub. Date: Jan. 20, 2022

(65) Prior Publication Data

US 2023/0275389 A1 Aug. 31, 2023

Related U.S. Application Data

(60) Provisional application No. 63/051,495, filed on Jul. 14, 2020.

(51) Int. Cl.
*H01S 3/06* (2006.01)
*H01S 3/067* (2006.01)

(52) U.S. Cl.
CPC ................................ *H01S 3/06729* (2013.01)

(58) Field of Classification Search
CPC .................................................. H01S 3/06729
See application file for complete search history.

(56) References Cited

U.S. PATENT DOCUMENTS 4,252,403 A * 2/1981 Salisbury ............... G02B 6/262 385/127
4,266,851 A * 5/1981 Salisbury ............. G02B 6/2551 250/227.24
4,275,288 A * 6/1981 Makosch ............. B23K 26/073 219/121.75
6,751,388 B2 * 6/2004 Siegman .............. G02B 6/0285 385/124
7,668,211 B1 * 2/2010 Sudesh ............... H01S 3/06708 372/71
8,781,269 B2 * 7/2014 Huber .................... G02B 6/262 385/18

(Continued)

OTHER PUBLICATIONS

Deng et al., Annular arrayed-waveguide fiber for autofocusing Airy-like beams, Opt. Lett. 41, 824-827 (2016) (Year: 2016).*

(Continued)

*Primary Examiner* — Peter Radkowski
(74) *Attorney, Agent, or Firm* — Wiley Rein LLP

(57) ABSTRACT

Optical fiber structures for generating a single mode, saddle shaped output beam include first and second lengths of fiber. The first length of fiber has a first input end configured to receive a single mode gaussian beam. The second length of fiber has a second input end coupled to an output end of the first length of fiber. The second length of fiber includes a centrally located anti-guiding core and an annular guiding region coaxially encompassing the centrally located anti-guiding core.

13 Claims, 13 Drawing Sheets

(56) References Cited

U.S. PATENT DOCUMENTS

| | | | | |
|---|---|---|---|---|
| 8,965,162 | B2 * | 2/2015 | Dragic | G02B 6/03694 385/141 |
| 10,656,330 | B2 * | 5/2020 | Victor | G02B 6/02042 |
| 10,656,440 | B2 | 5/2020 | Kliner et al. | |
| 10,663,768 | B2 * | 5/2020 | Martinsen | G02B 27/0933 |
| 10,677,984 | B2 * | 6/2020 | Brown | B23K 26/064 |
| 10,705,348 | B2 * | 7/2020 | Martinsen | G02B 27/0927 |
| 2003/0031442 | A1 * | 2/2003 | Siegman | G02B 6/03644 385/124 |
| 2005/0265678 | A1 * | 12/2005 | Manyam | G02B 6/03611 385/127 |
| 2006/0067632 | A1 | 3/2006 | Broeng et al. | |
| 2009/0034059 | A1 * | 2/2009 | Fini | H01S 3/06708 359/341.3 |
| 2011/0103759 | A1 * | 5/2011 | Dragic | G02B 6/03694 385/124 |
| 2013/0223792 | A1 * | 8/2013 | Huber | G02B 6/02042 385/127 |
| 2017/0248793 | A1 * | 8/2017 | Sukhman | G02B 27/1006 |
| 2018/0180803 | A1 * | 6/2018 | Victor | B22F 3/24 |
| 2018/0217324 | A1 * | 8/2018 | Brown | B23K 26/067 |
| 2018/0217410 | A1 * | 8/2018 | Martinsen | G02B 27/0933 |
| 2018/0239154 | A1 * | 8/2018 | Martinsen | G02B 6/0008 |
| 2019/0265489 | A1 * | 8/2019 | Sukhman | B23K 26/0626 |
| 2020/0116926 | A9 * | 4/2020 | Victor | B23K 26/38 |

OTHER PUBLICATIONS

Gandomkar Yarandi, Parisa, High Power Gain Guided Index Antiguided Fiber Lasers and Amplifiers (2013). Theses and Dissertations. 249. https://dc.uwm.edu/etd/249 (Year: 2013).*

Metel et al., (2018). Power Density Distribution for Laser Additive Manufacturing (SLM): Potential, Fundamentals and Advanced Applications. Technologies. 7. 5. 10.3390/technologies7010005. (Year: 2018).*

Lai CH, Chen HY, Du CH, Chiou YP. Gain-guided index-antiguided fiber with a Fabry-Perot layer for large mode area laser amplifiers. Opt Express. Feb. 23, 2015;23(4):3876-85. doi: 10.1364/OE.23.003876. PMID: 25836427 (Year: 2015).*

E. Siegman, "Propagating modes in gain-guided optical fibers," J. Opt. Soc. Am. A 20, 1617-1628 (2003) (Year: 2003).*

Tanglin Zhao et al., Switchable and tunable erbium-doped fiber lasers using a hollow-core Bragg fiber, 2016 Laser Phys. Lett. 13 115104 (Year: 2016).*

Hyun Su Kim and Martin C. Richardson, "Output characteristic of a gain guided, index anti-guided fiber amplifier under the condition of gain saturation," Opt. Express 17, 15969-15974 (2009) (Year: 2009).*

Ernst-Georg Neumann, "Beam transformers for obtaining low-loss splices between dissimilar single-mode fibers," J. Opt. Soc. Am. A 4, 1021-1029 (1987) (Year: 1987).*

E. A. Romanova, L. A. Melnikov and E. V. Bekker, "Light propagation in optical anti-guiding structures with Kerr-like nonlinearity," International Conference on Transparent Optical Networks (Cat. No. 99EX350), Kielce, Poland, 1999, pp. 251-254, doi: 10.1109/ICTON.1999.781897. (Year: 1999).*

Xiao Shen and Wei Wei, "Gain guided and index alternate-guided fibers designed for large-mode-area and single-mode laser with higher output power and slope efficiency," Opt. Express 24, 1089-1095 (Year: 2016).*

International Search Report and Written Opinion dated Oct. 14, 2021, for International Patent Application No. PCT/US2021/041670.

* cited by examiner 622
622
620
Radial Distance
618
600
604
616
612
616
614
610
612
614
602
624
608
606
Radial Distance

SINGLE MODE BEAM

RELATED APPLICATION

This United States Non-Provisional Patent application is a National Stage Entry that relies on and claims priority to International Patent Application No. PCT/US2021/041670, filed on Jul. 14, 2021, and also relies on and claims priority benefit of U.S. Provisional Patent Application No. 63/051,495, filed on Jul. 14, 2020, the contents of both of which are hereby incorporated by reference in their entireties.

TECHNICAL FIELD

The disclosure relates to methods and devices for generating a single mode, saddle shaped output beam.

BACKGROUND INFORMATION

For some laser applications (such as additive manufacturing), a gaussian single mode laser beam is used to achieve a minimum spot size and/or longest Rayleigh range.

However, gaussian single mode beams can sometimes create hot spots at the center of the beam due to the perimeter of the beam conductively heating the center, as well as the light itself. This sometimes causes unwanted vaporization, spatter or voids.

SUMMARY OF THE DISCLOSURE

To overcome the above described deficiencies in the conventional technology, coupling an single mode input beam into a ring fiber with a depressed index hole in the center, one can create a single mode saddle beam with a relatively low $M^2$ less than 2 and a large dip in intensity in the center (between 0% and 100%) so the center of the beam does not get overheated due to the combination of conduction heating and absorptive heating. The saddle beam shape creates a flatter temperature profile when processing materials, and it is compatible with any spot size achievable using a single mode laser for any given wavelength. This beam shape may have an $M^2$ value as low as 1, making it desirable for high-precision processes. There is no known upper limit on the $M^2$ value achievable. The ability to have a low $M^2$ also allows the resultant beam to maintain its shape while being defocused (either intentionally or due to alignment errors).

This type of fiber design could be advantageous for certain fiber laser markets such as additive manufacturing or welding and give nLIGHT a differentiated product that is not currently available on the market.

In one aspect, an optical fiber structure for generating a single mode, saddle shaped output beam, the optical fiber structure includes a first length of fiber having a first input end configured to receive a single mode input beam, the first length of fiber having a first refractive index profile (RIP) defined by a centrally located guiding region and an annular region coaxially encompassing the centrally located guiding region, the centrally located guiding region having a first diameter and a first index of refraction, and the annular region having a second index of refraction that is less than the first index of refraction, and a second length of fiber having a second input end coupled to an output end of the first length of fiber, the second length of fiber having a second RIP defined by a centrally located anti-guiding core and an annular guiding region coaxially encompassing the centrally located anti-guiding core, the centrally located anti-guiding core having a second diameter and a third index of refraction, the annular guiding region having a third diameter and a fourth index of refraction that is greater than the third index of refraction, the second diameter being less than or equal to half of the first diameter, and the third diameter being less than or equal to two times the first diameter.

The foregoing and other objects, features, and advantages will become more apparent from the following detailed description, which proceeds with reference to the accompanying figures which may not be drawn to scale.

BRIEF DESCRIPTION OF THE DRAWINGS

To easily identify the discussion of any particular element or act, the most significant digit or digits in a reference number refer to the figure number in which that element is first introduced.

DETAILED DESCRIPTION OF EMBODIMENTS

Figure 1:
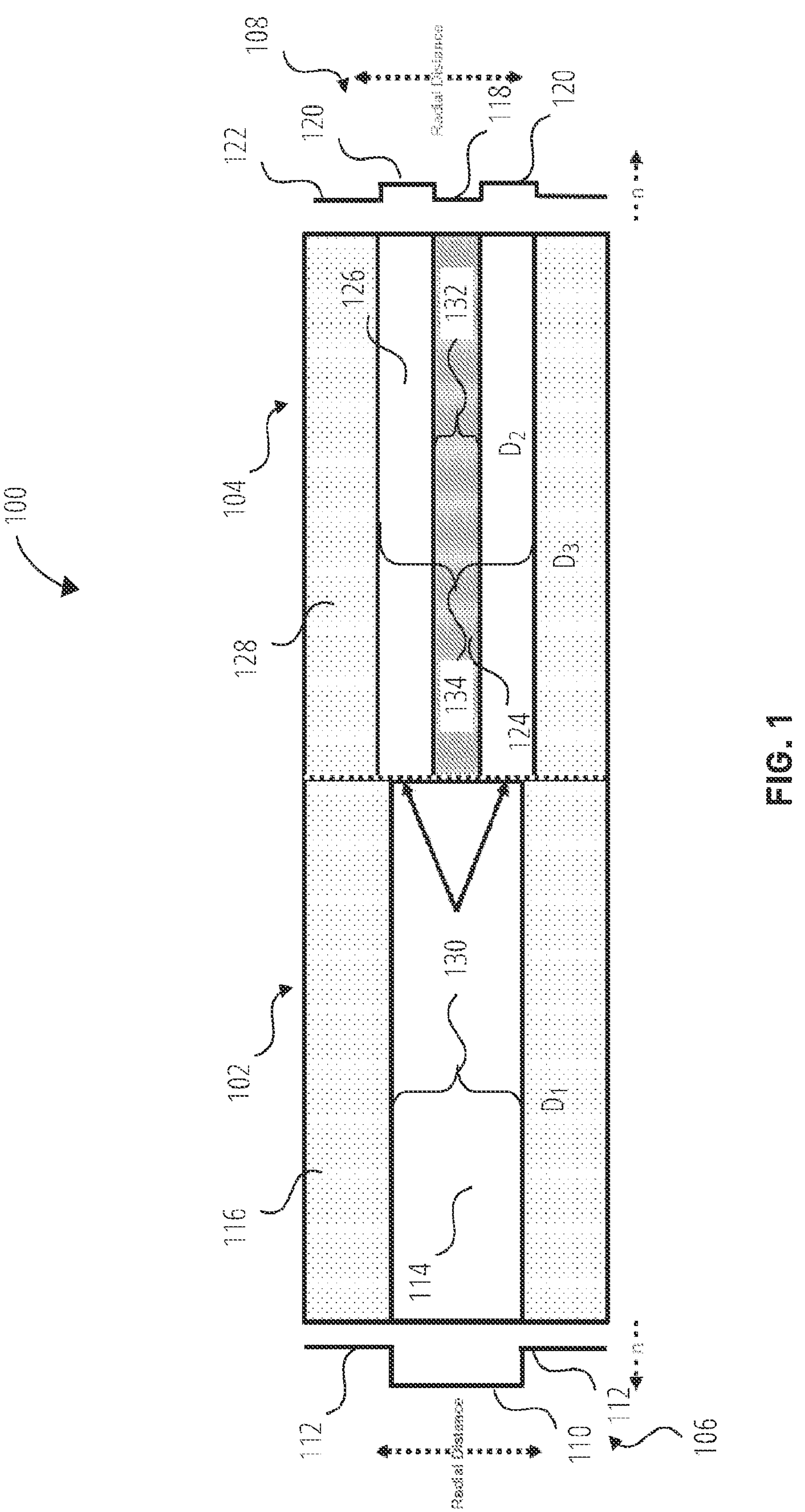
FIG. 1 is a cross-section view of an optical fiber structure, according to one embodiment.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation. Moreover, in the following examples, laser components and assemblies are described at a high level of abstraction and do not include a complete description of all mechanical, electrical and optical elements necessary for operation.

As used herein, optical radiation refers to electromagnetic radiation at wavelengths of between about 100 nm and 10 μm, and typically between about 500 nm and 2 μm. Examples based on available laser diode sources and optical fibers generally are associated with wavelengths of between about 800 nm and 1700 nm. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light or beams in some examples and need not be at visible wavelengths. Forward-propagating light or optical beams or beam portions refer to light, beams, or beam portions that propagate in a common direction with a processing beam that is directed to a target. Backward-propagating light or optical beams or beam portions refer to light, beams, or beam portions that propagate in a common and opposite direction of a processing beam that is directed to a target.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

A saddle beam shape (also referred to as a saddle beam or saddle mode) is defined by an intensity profile of light having a smooth transition between minimum and maximum intensity, with a center of the intensity profile being a minimum (or local minimum) located between two maximums. Moreover, a ring beam shape (also referred to as a ring beam or ring mode) includes relatively little power in the center. For the purposes of this disclosure, a ring mode is therefore considered a specific type of saddle beam shape having little or now power in the center of the beam. Additional details of generating saddle and ring beam shapes using variable beam characteristics (VBC) fibers are described in U.S. Pat. No. 10,663,768 of Martinsen et al., which issued May 26, 2020 to nLIGHT, Inc.

FIG. 1 shows an optical fiber structure 100 including a first length of fiber 102 and a second length of fiber 104. First length of fiber 102 defines a first RIP 106, and second length of fiber 104 defines a second RIP 108 that is different from first RIP 106. In some embodiments, first length of fiber 102 is a fiber laser source seeding second length of fiber 104, which creates a so-called saddle beam shape.

First RIP 106 includes a central higher index region 110 and an outer lower index region 112 corresponding to, respectively, a centrally located guiding region 114 and cladding glass 116.

Second RIP 108 includes a core low index region 118, an annular higher index region 120, and an outer lower index region 122 corresponding to, respectively, a centrally located anti-guiding core 124 (also referred to as a hole), an annular guiding region 126 coaxially encompassing the centrally located anti-guiding core 124, and cladding glass 128 coaxially encompassing the annular guiding region 126.

To create a saddle beam, optical fiber structure 100 is configured as follows. Centrally located guiding region 114 has a first diameter $D_1$ 130, centrally located anti-guiding core 124 has second diameter $D_2$ 132, and annular guiding region 126 has a third diameter $D_3$ 134. Second diameter $D_2$ 132 is less than or equal to half of first diameter $D_1$ 130. Third diameter $D_3$ 134 is less than or equal to two times first diameter $D_1$ 130.

$D_2 \leq (0.5 D_1);\ D_3 \leq (2 D_1)$ Equation 1

In some embodiments, centrally located guiding region 114 and annular guiding region 126 can have about the same outer diameter or different outer diameters, and their numerical aperture (NA) values may be the same or different. A length of fiber may also be coated with a guiding or anti-guiding polymer (polymer not shown in drawing figures).

In some embodiments, annular guiding region 126 and centrally located anti-guiding core 124 are constructed of fused silica. For example, high index material corresponding to annular guiding region 126 is grown on an inside surface of a capillary tube Toward the end of that initial process, pure glass is grown on the surface of the high index material. All the material is then collapsed down, resulting in preform. The preform is then drawn out to create a length of fiber having a precise hole (e.g., 2 microns) corresponding to centrally located anti-guiding core 124. One aspect of this that makes such a small diameter possible is that centrally located anti-guiding core 124 is pure silica in some embodiments, which is amenable to fiber preform production processes. In other embodiments, centrally located anti-guiding core 124 may be doped, provided that steps are taken to ensure the RIP is not significantly altered during the process (e.g., dopants are not burnt off during a preform collapsing process, which would result in a less flat RIP in the central region). In yet other embodiments, dopants may be intentionally burnt off to form an anti-guiding region (e.g., over processing preform) to alter the RIP in the central region.

Optical fiber structure 100 is used to create the saddle beam shape, and it may be spliced directly to a single-mode, few-moded, or LMA fiber laser output. In other embodiments, optical fiber structure 100 may be used in conjunction with the aforementioned VBC mechanism to couple a gaussian or flat top beam into a saddle beam, as described in more detail below.

Figure 2:
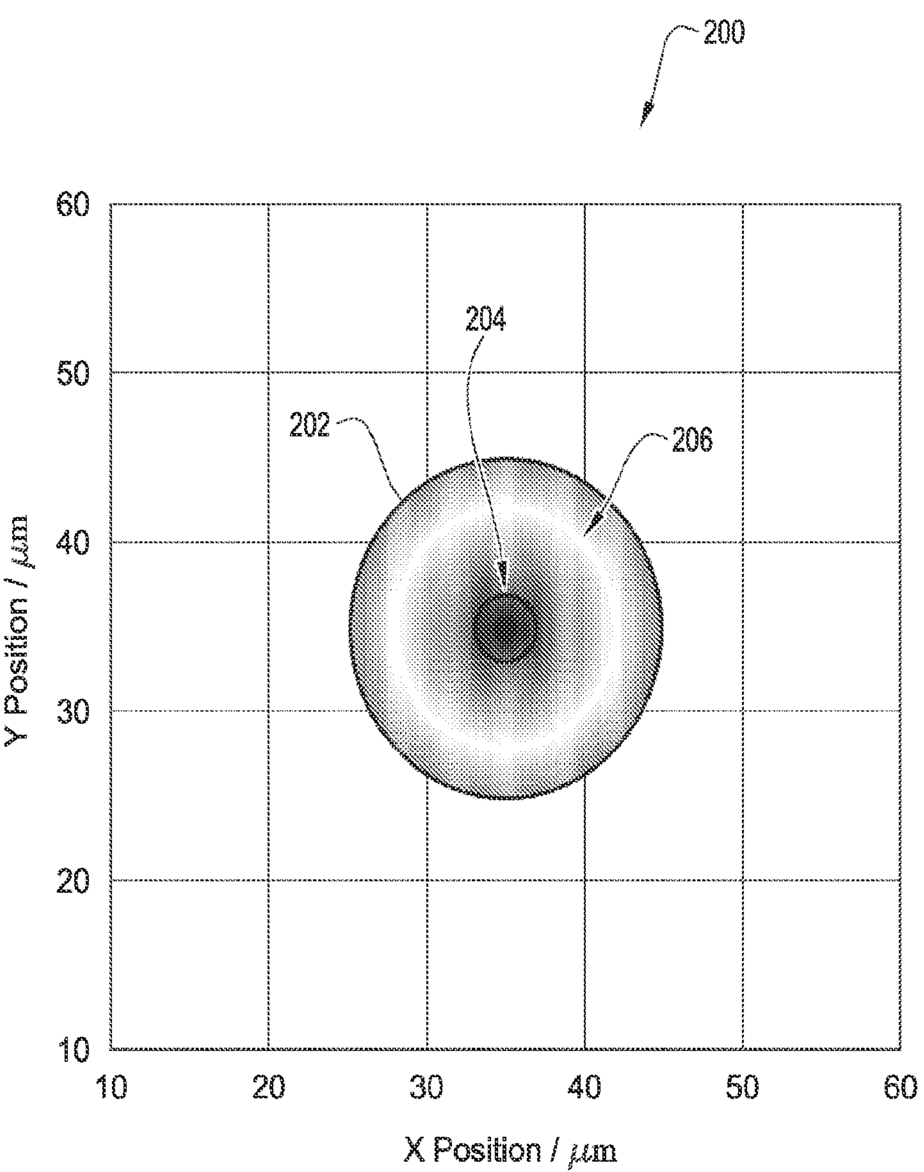
FIG. 2 is an intensity distribution plot of a beam provided at an output of the optical fiber structure of FIG. 1.

FIG. 2 shows an intensity distribution 200 for a ring beam 202 delivered at an output second length of fiber 104 (FIG. 1). Ring beam 202 is shown with a maximum dip in intensity at its center 204 (i.e., little or no light in its center). More generally, the configuration shown in FIG. 1 produces a central dip in intensity of light at a center of a beam profile, decreasing the intensity at the center of the beam by anywhere from 10% to 100%. And it produces a continuous transition from its peak intensity 206 to the dip in intensity at center 204 of the saddle/ring.

Figure 3:
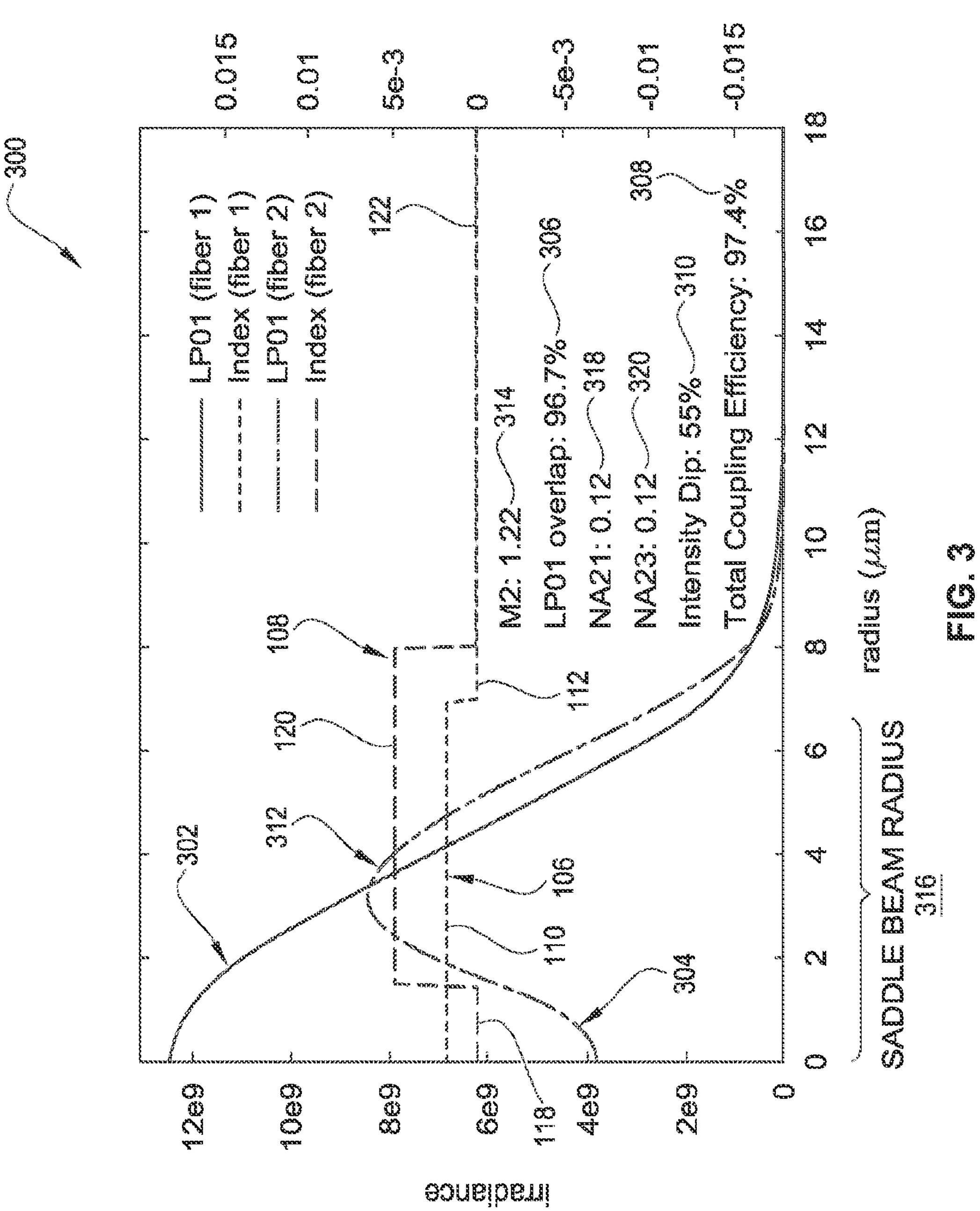
FIG. 3 is screenshot of an example optical fiber model that is based on the optical fiber structure of FIG. 1.

FIG. 3 shows an optical fiber model 300 that is based on optical fiber structure 100 (FIG. 1). As shown, a standard single mode fiber is spliced straight onto a ring fiber with a low index hole in the center. Since each vertical half of optical fiber structure 100 is the vertical mirror image of the other half, one radius is shown in optical fiber model 300. Accordingly, optical fiber model 300 shows half of first RIP 106 and half of second RIP 108. Second RIP 108 is the example of optical fiber model 300 corresponds to a 2/15/360 optical fiber having 1.45/1.455/1.45 refractive indexes, respectively.

Optical fiber model 300 also shows intensity profiles of a single mode gaussian input beam 302 and a single mode saddle output beam 304 guided by, respectively first length of fiber 102 and second length of fiber 104. LP01 modal overlap 306 of the input beam and the guided modes in the saddle shape is very low loss. A total coupling efficiency 308 (sum of all light that is coupled into annular guiding region 126, regardless of mode) is over 90%, with $M^2$ being between 1 and 2. Optical fiber structure 100 in combination with single mode gaussian input beam 302 generates an intensity dip 310 in peak intensity 312, while maintaining an $M^2$ value 314 of 1.2, and a saddle beam radius of about 6.5 microns (see e.g., saddle beam radius 316).

FIG. 3 shows core low index region 118 and outer lower index region 122 have the same index of refraction (1.45). Therefore, a first NA 318 of annular guiding region 126 near centrally located anti-guiding core 124 is the same (NA of 0.12) as that of a second NA 320 near cladding glass 128. In other embodiments, a first NA and a second NA are different when core low index region 118 and outer lower index region 122 have different indices of refraction. An NA range of about 0.05 to about 0.22 is possible in some embodiments.

Figure 4:
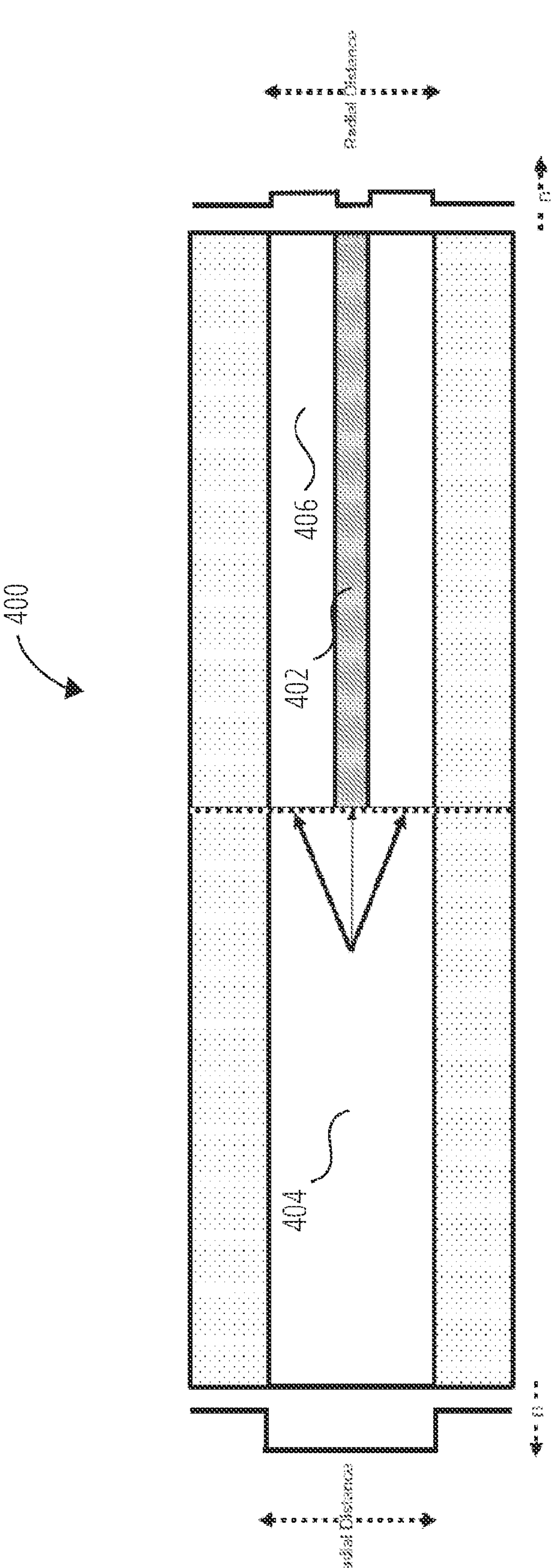
FIG. 4 is a cross-section view of an optical fiber structure, according to another embodiment.

FIG. 4 is another example of an optical fiber structure 400 configured to produce a saddle mode. Compared to optical fiber structure 100 (FIG. 1), a centrally located anti-guiding core 402 has a smaller diameter than that of centrally located anti-guiding core 124. A diameter of centrally located guiding region 404 is also larger than that of centrally located guiding region 114. Notwithstanding these changes, the relationships between the diameters of centrally located anti-guiding core 402, centrally located guiding region 404, and an annular guiding region 406 are consistent with those of Equation 1.

Figure 5:
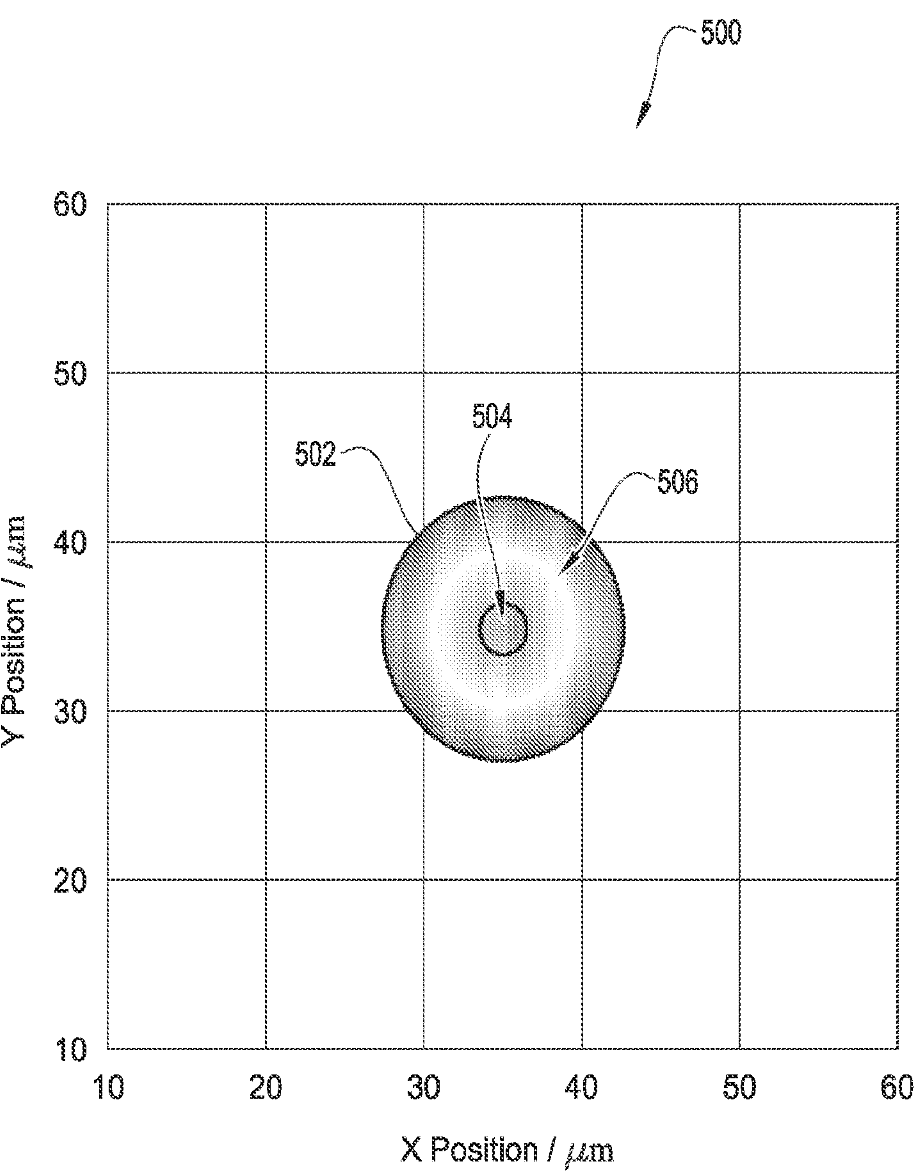
FIG. 5 is an intensity distribution plot of a beam provided at an output of the optical fiber structure of FIG. 4.

FIG. 5 shows an intensity distribution 500 provided by optical fiber structure 400. The changes in the configuration of optical fiber structure 400, compared to optical fiber structure 100, result in a saddle beam 502 having an intermediate dip (50% less) in intensity at a center 504 compared to at a peak 506.

More generally, by decreasing the diameter of centrally located anti-guiding core 124 (FIG. 1), the index of centrally located anti-guiding core 124 or annular guiding region 126, and the outer diameter of annular guiding region 126, different dip ratios, $M^2$ values, and beam diameters may be achieved. It is believed, however, that an advantage of the disclosed embodiments compared to conventional ring modes, is an ability to refocus this spot back down to a very small size, with a long Rayleigh range. Conventional ring modes have relatively high $M^2$ values and generate very hot spots in the beam center as the beam propagates through space, which can cause unwanted impacts on processes.

Figure 6:
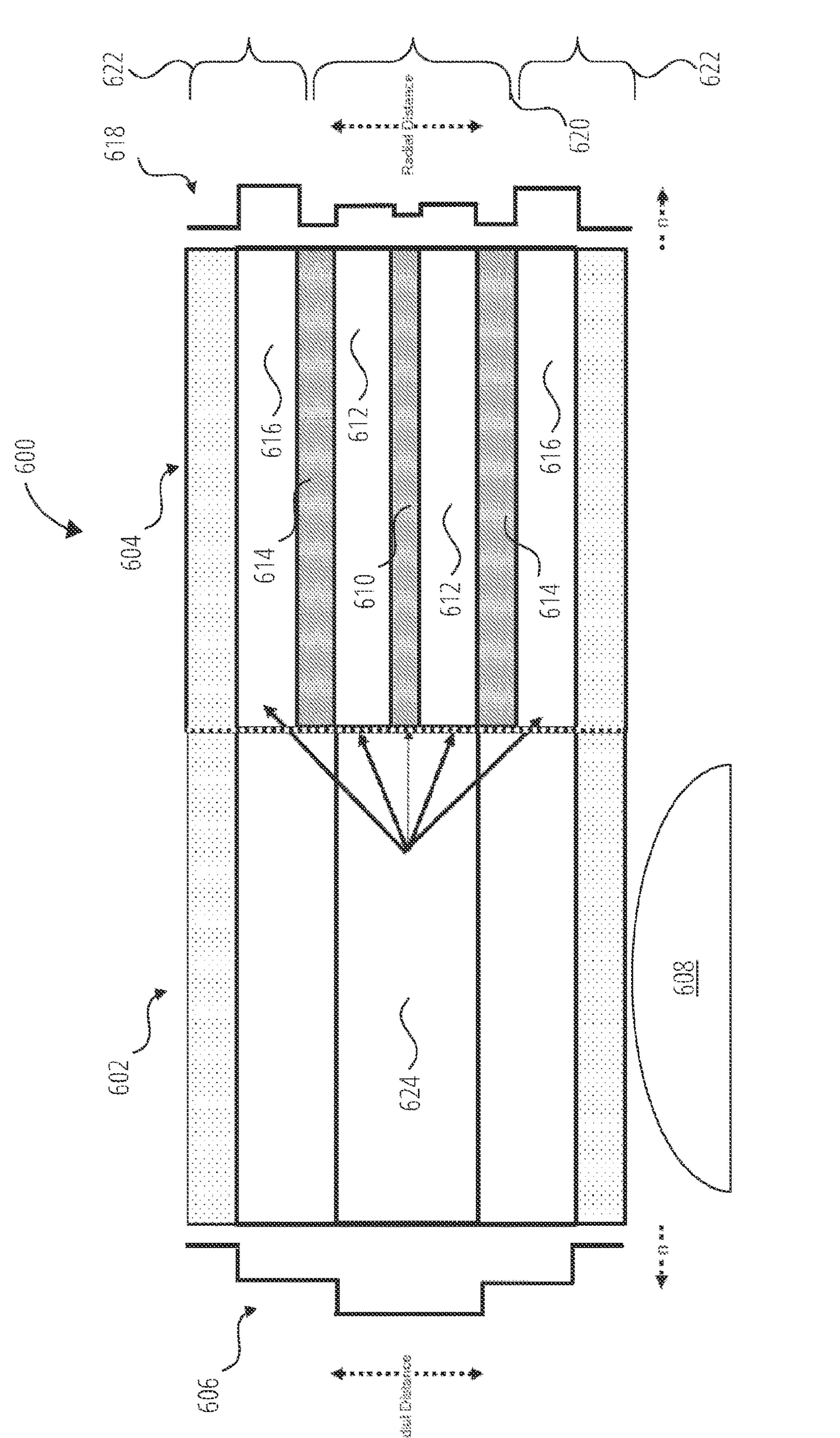
FIG. 6 is a cross-section view of an optical fiber structure capable of varying beam characteristics in response to an externally applied perturbation, according to another embodiment.

FIG. 6 shows an optical fiber structure 600 including a first length of fiber 602 and a second lengths of fiber 604. First length of fiber 602 is bend-sensitive and defines a pedestal RIP 606, similar to the length of fiber shown and described with reference to FIG. 12 in the '768 patent of Martinsen et al. Bend sensitive means that first length of fiber 602 can be bent so as to change the beam characteristics of a beam propagating therein. For example, an externally applied perturbation may change the radial position of a single mode gaussian beam propagating in first length of fiber 602.

Perturbation of first length of fiber 602 includes bending it in one or more axes using at least one mandrel 608. Other options for applying perturbation include use of a transducer, heat, actuators, or use of other types of perturbation shown and described with reference to FIG. 24 of the '768 patent of Martinsen et al.

Second length of fiber 604 includes a centrally located anti-guiding core 610, a first annular confinement region 612 coaxially encompassing centrally located anti-guiding core 610, an anti-guiding annular region 614 coaxially encompassing first annular confinement region 612, and a second annular confinement region 616 coaxially encompassing anti-guiding annular region 614.

In some embodiments, anti-guiding annular region 614 is formed by using fluorine-doped silica. In other embodiments, an anti-guiding region can be formed of other materials so that is has a lower index than that of its adjacent regions. Thus, it could be formed from silica, germanium-doped silica, fluorine-doped silica, or other materials.

Second lengths of fiber 604 defines RIP 618. In its inner saddle mode portion 620, RIP 618 facilitates the saddle mode as described with reference to FIG. 1. And as first length of fiber 602 is perturbed to displace light into second annular confinement region 616 toward an outer ring mode structure 622 of RIP 618, it facilitates a ring mode. Thus, by perturbing first length of fiber 602, light is transitioned between a center saddle beam and an outer ring beam according to a desired saddle-to-ring ratio. In other words, some light may remain in anti-guiding annular region 614 or first annular confinement region 612, or it could be eliminated entirely depending on design.

Aside from the additional regions used for producing a ring mode, the relationships between the diameters of centrally located anti-guiding core 610, centrally located guiding region 624, and an annular guiding first annular confinement region 612 are consistent with those of Equation 1.

Figure 7:
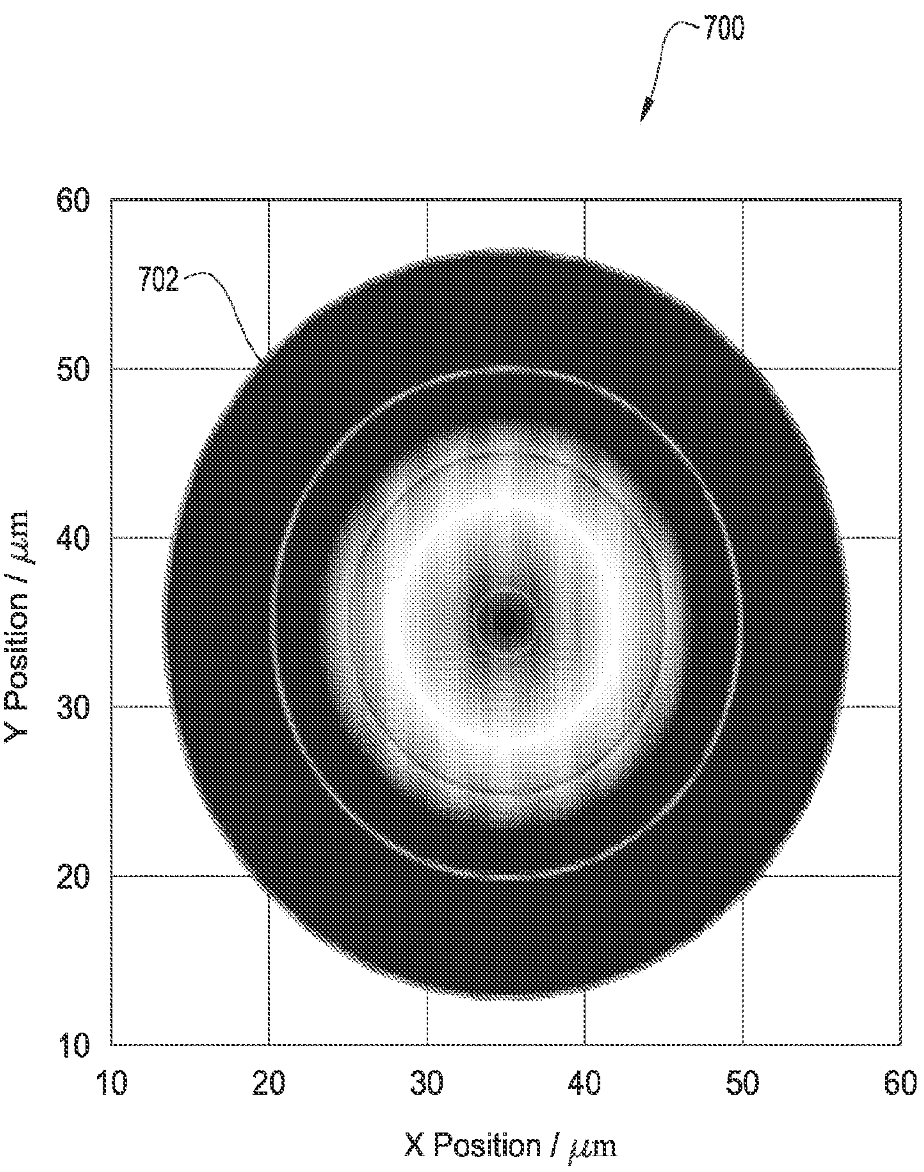
FIG. 7 is an intensity distribution plot of a beam provided at an output of the optical fiber structure of FIG. 6 in response to little or no perturbation.

FIG. 7 shows an intensity distribution 700 when first length of fiber 602 (FIG. 6) is not perturbed. As mentioned previously, a center saddle beam 702 is provided at an output of second length of fiber 604 with little or no light in the center region.

Figure 8:
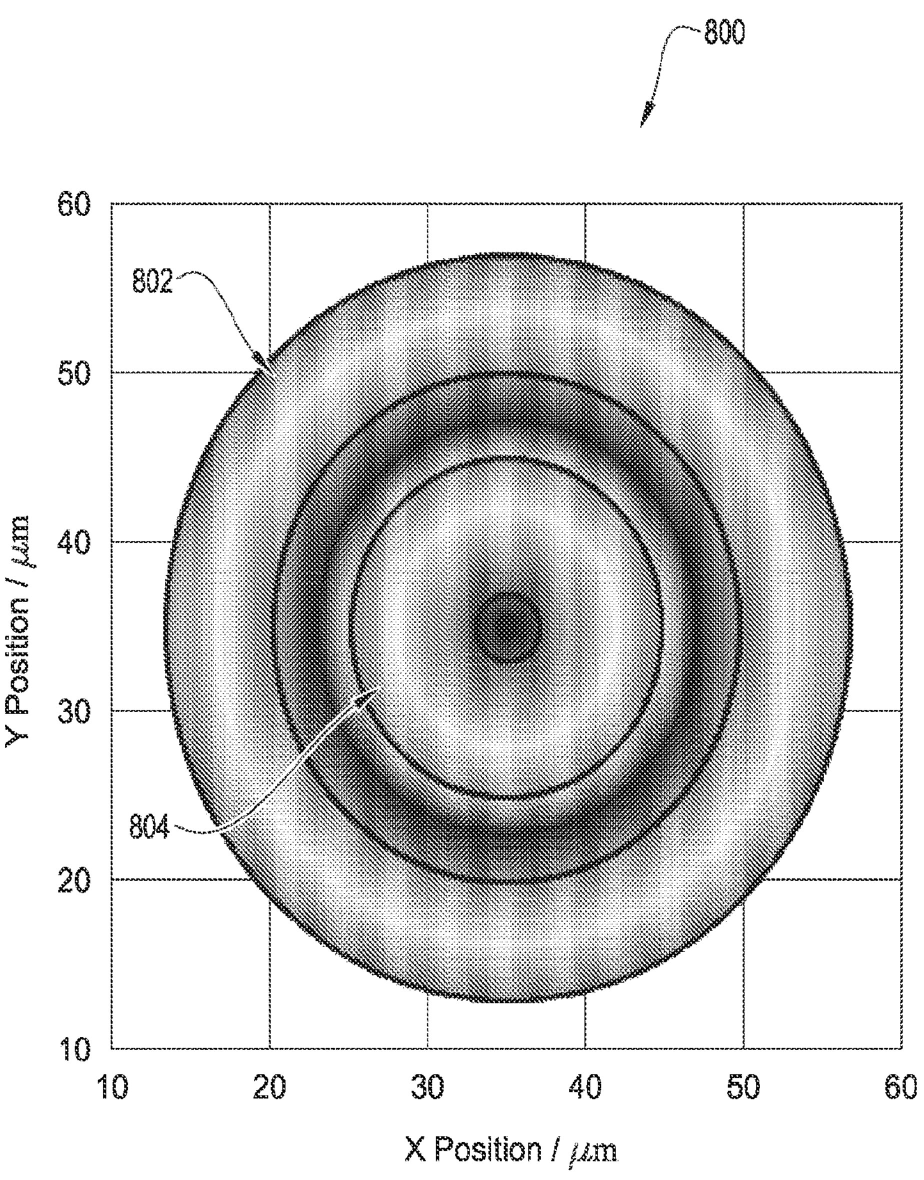
FIG. 8 is an intensity distribution plot of a beam provided at an output of the optical fiber structure of FIG. 6 in response to an intermediate amount of perturbation.

FIG. 8 shows an intensity distribution 800 produced in response to first length of fiber 602 (FIG. 6) being moderately perturbed, e.g., bent to displace some light to second annular confinement region 616 while maintaining light in first annular confinement region 612. Power is split evenly between a saddle beam region 802 and a ring beam region 804.

Figure 9:
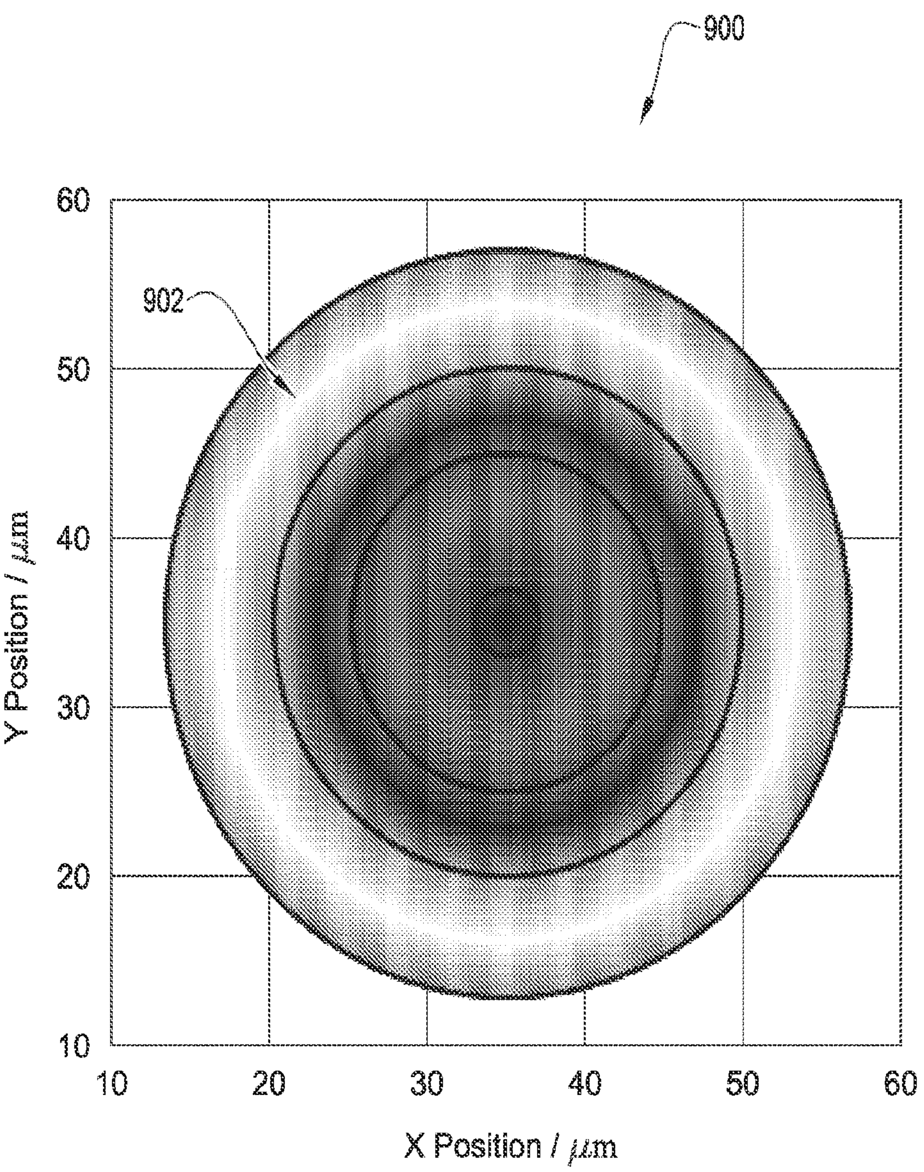
FIG. 9 is an intensity distribution plot of a beam provided at an output of the optical fiber structure of FIG. 6 in response to a complete amount of perturbation.

FIG. 9 shows an intensity distribution 900 produced in response to first length of fiber 602 (FIG. 6) being more fully perturbed, e.g., bent to displace most light to second annular confinement region 616 while maintaining light in first annular confinement region 612. Maximum power is located in a ring beam region 902.

Figure 10:
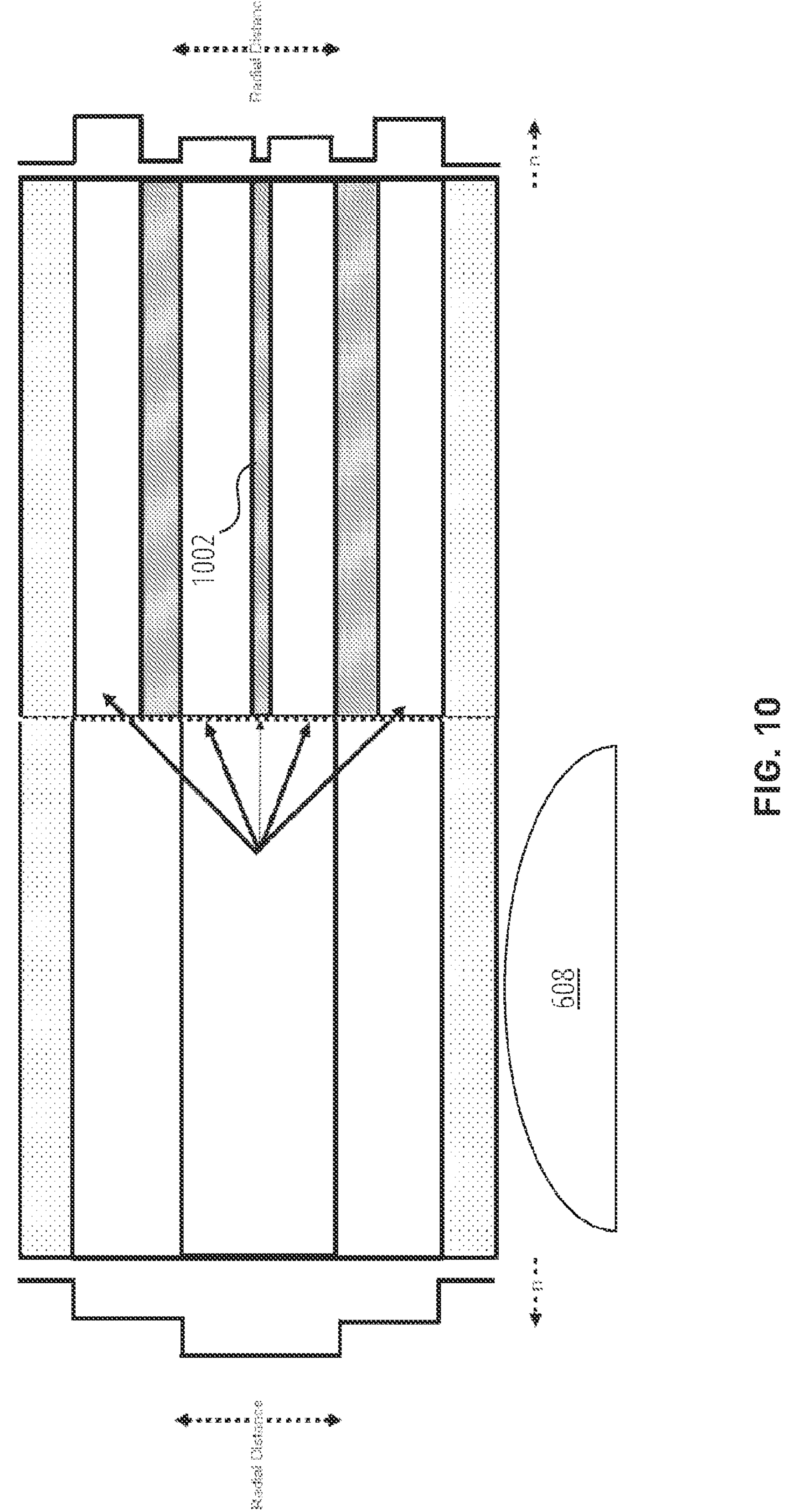
FIG. 10 is a cross-section view of an optical fiber structure capable of varying beam characteristics in response to an externally applied perturbation, according to another embodiment.
Figure 11:
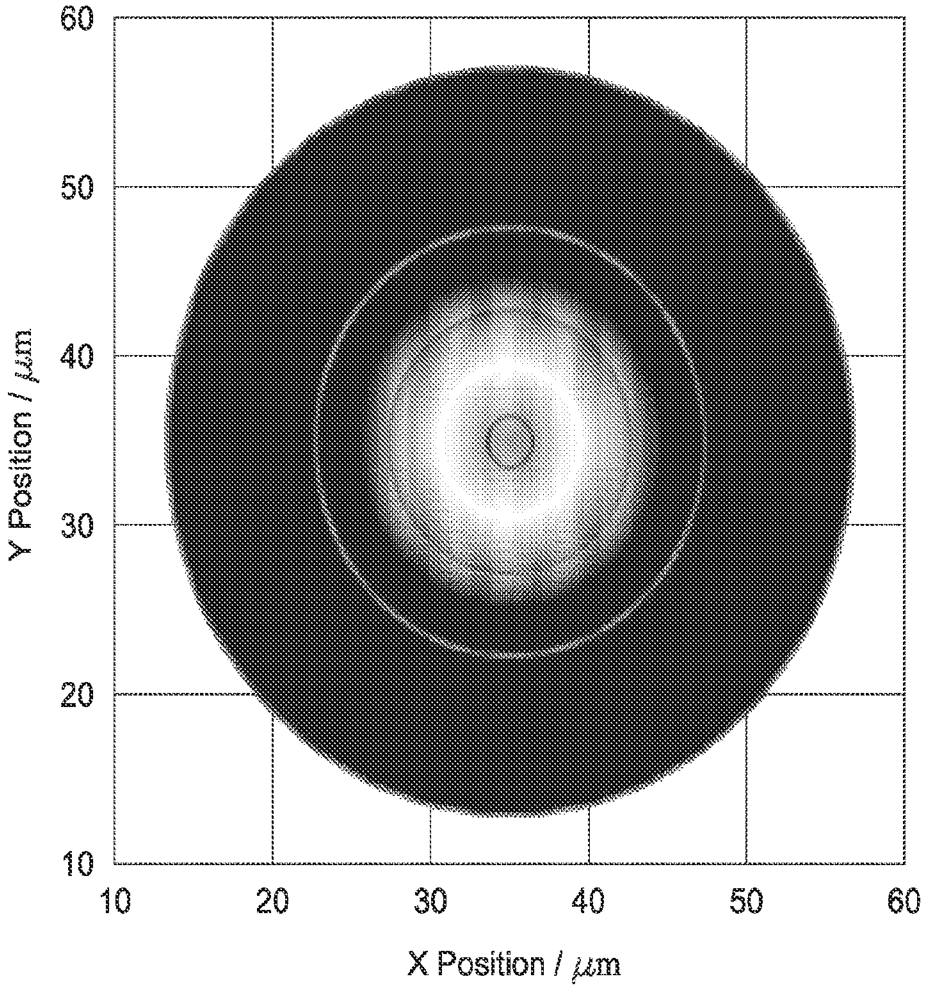
FIG. 11 is an intensity distribution plot of a beam provided at an output of the optical fiber structure of FIG. 10 in response to little or no perturbation.
Figure 12:
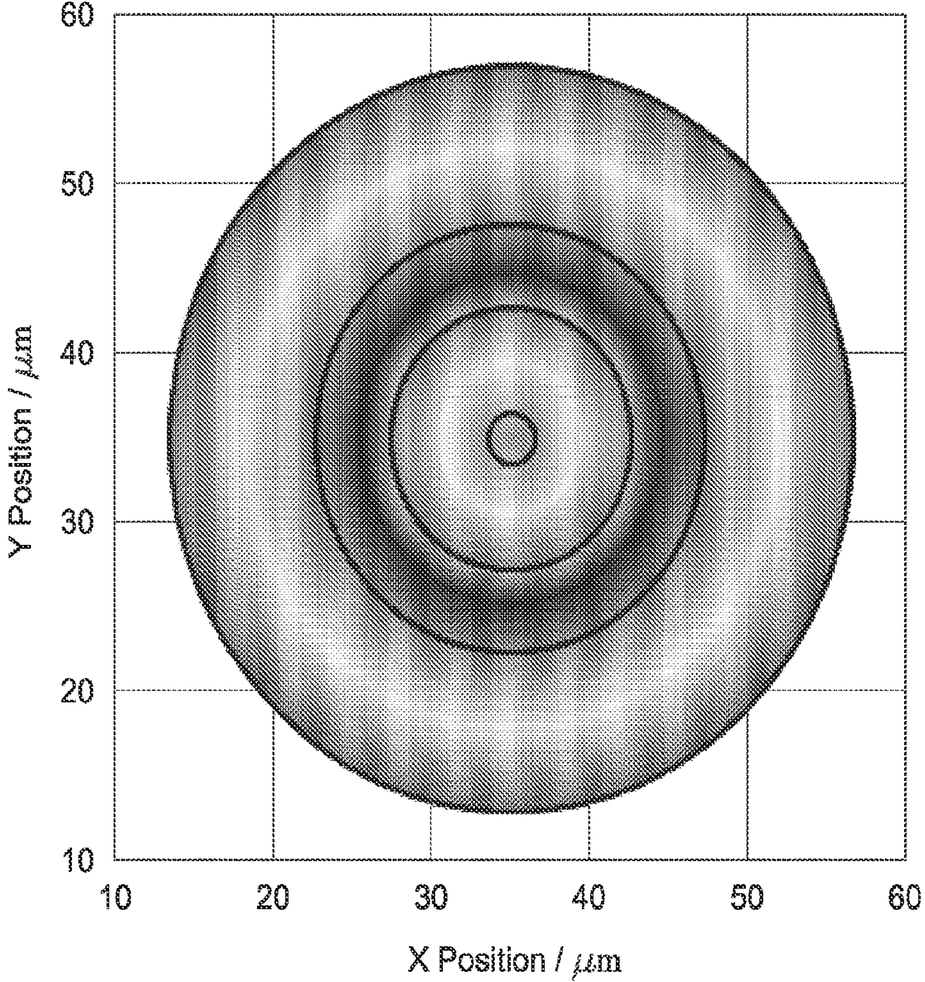
FIG. 12 is an intensity distribution plot of a beam provided at an output of the optical fiber structure of FIG. 10 in response to an intermediate amount of perturbation.
Figure 13:
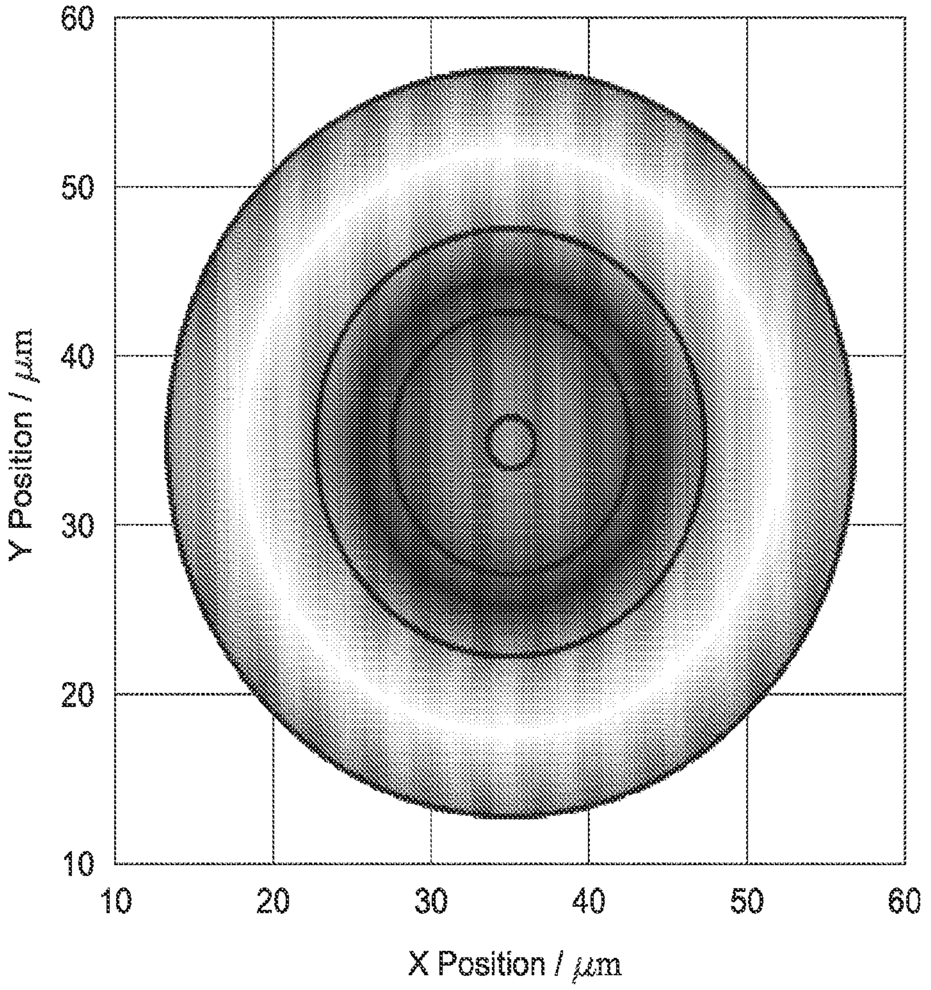
FIG. 13 is an intensity distribution plot of a beam provided at an output of the optical fiber structure of FIG. 10 in response to a complete amount of perturbation.

FIG. 10 shows another optical fiber structure 1000 that is similar to optical fiber structure 600 (FIG. 6), but its anti-guiding core 1002 is smaller than centrally located anti-guiding cores 610. This results in a greater amount of power in the center of a saddle shape. For example, FIG. 11, FIG. 12, and FIG. 13 are each similar to FIG. 7, FIG. 8, and FIG. 9, but in each case a greater amount of power is shown in a center of the saddle shape.

As described previously, aside from the regions used for producing a ring mode, the relationships between the diameters for central saddle mode are consistent with those of Equation 1.

Having described and illustrated the general principles of examples of the presently disclosed technology, it should be apparent that the examples may be modified in arrangement and detail without departing from such principles. Skilled persons, therefore, will appreciate that many changes may be made to the details of the above-described embodiments without departing from the underlying principles of the invention. The scope of the present invention should, therefore, be determined only by the following claims.

The invention claimed is:

1. An optical fiber structure, comprising:

a first length of fiber having a first input end configured to receive a single mode input beam, the first length of fiber having a first refractive index profile (RIP) defined by a centrally located guiding region and an annular region coaxially encompassing the centrally located guiding region, the centrally located guiding region having a first diameter and a first index of refraction, and the annular region having a second index of refraction that is less than the first index of refraction; and a second length of fiber having a second input end coupled to an output end of the first length of fiber, the second length of fiber having a second RIP defined by a centrally located anti-guiding core and an annular guiding region coaxially encompassing the centrally located anti-guiding core, the centrally located anti-guiding core having a second diameter and a third index of refraction, the annular guiding region having a third diameter and a fourth index of refraction that is greater than the third index of refraction, the second diameter being less than or equal to half of the first diameter, and the third diameter being less than or equal to two times the first diameter, wherein the centrally located anti-guiding core is sized to support propagation of a single mode, saddle shaped output beam through the second length of fiber to a second output end of the second length of fiber.

2. The optical fiber structure of claim 1, in which the annular guiding region of second length of fiber comprises a first annular guiding region, the second length of fiber including an outer ring mode structure, the outer ring mode structure including an anti-guiding annular region and a second annular guiding region, the anti-guiding annular region coaxially encompassing the first annular guiding region, and the second annular guiding region coaxially encompassing the anti-guiding annular region.

3. The optical fiber structure of claim 2, in which the first length of fiber is bend sensitive to direct light toward the outer ring mode structure in response to externally applied perturbation.

4. The optical fiber structure of claim 3, in which the first RIP is a pedestal RIP.

5. The optical fiber structure of claim 1, wherein the saddle shaped output beam has an intermediate dip in a range from about 10% to 100% in intensity at its center compared to at its location of peak power.

6. The optical fiber structure of claim 1, in which the second length of fiber is configured to provide the single mode, saddle shaped output beam having an $M^2$ value in a range from about 1 to about 2.

7. The optical fiber structure of claim 1, in which the second length of fiber is configured to provide the single mode, saddle shaped output beam having a total coupling efficiency of at least about 90%.

8. The optical fiber structure of claim 1, in which a numerical aperture (NA) of the annular guiding region is in a range of about 0.05 to about 0.22.

9. The optical fiber structure of claim 8, in which the annular guiding region has a first NA and a second NA that are different.

10. The optical fiber structure of claim 1, in which the single mode, saddle shaped output beam includes little or no optical power in its center and substantially corresponds to a ring mode.

11. The optical fiber structure of claim 1, in which the single mode input beam is a gaussian beam.

12. The optical fiber structure of claim 1, in which the single mode input beam is a super gaussian beam.

13. The optical fiber structure of claim 1, in which the single mode input beam is a flat top beam.

* * * * *